Sept. 29, 1925.

A. L. RUTHVEN

SIMPLEX TRAIN CONTROL

Original Filed June 26, 1922

Inventor:
A. L. RUTHVEN,
By Monroe E. Miller
Attorney.

Patented Sept. 29, 1925.

1,555,717

UNITED STATES PATENT OFFICE.

ALFRED L. RUTHVEN, OF ROCHESTER, NEW YORK, ASSIGNOR TO UNION SIMPLEX TRAIN CONTROL CO. INC., OF ROCHESTER, NEW YORK, A CORPORATION OF DELAWARE.

SIMPLEX TRAIN CONTROL.

Application filed June 26, 1922, Serial No. 571,062. Renewed March 2, 1925.

*To all whom it may concern:*

Be it known that I, ALFRED L. RUTHVEN, a citizen of the United States, residing at Rochester, in the county of Monroe and State of New York, have invented certain new and useful Improvements in Simplex Train Controls, of which the following is a specification, reference being had therein to the accompanying drawing.

The present invention relates to train controlling apparatus, and aims to provide a novel and improved controlling means for use in apparatus of that kind, in order to provide for effective and reliable control of the vehicle equipment from the track.

Another object of the invention is to provide means for accomplishing, first, the elimination of false signals or controlling conditions from the track when the train or vehicle is travelling between the controlling stations or points of the track, and, second, the proper functioning of the apparatus when passing a controlling station or point or to provide a predetermined condition, such as danger or vehicle stopping condition, if the apparatus fails to operate as intended when passing the controlling station.

The improvements are especially useful in the contact type of control, of which there are several kinds, in order to assure against accidental signals or control conditions between the controlling stations, and to assure of the contact means or devices being in operation when a controlling station is passed.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein—

Figure 1:
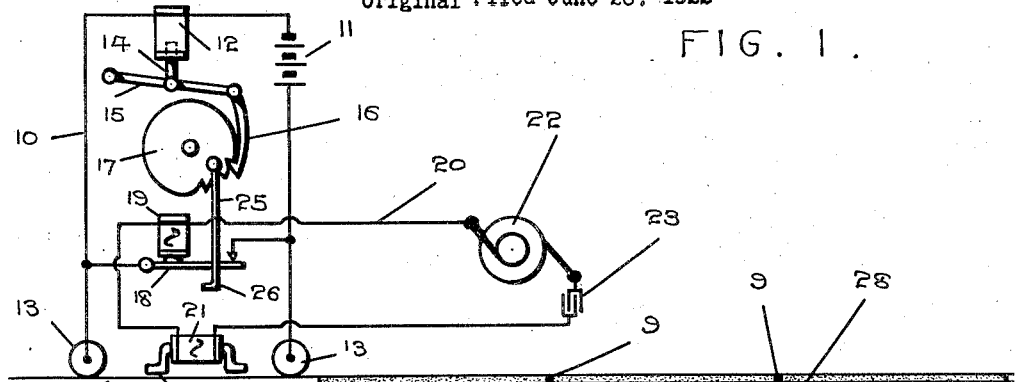
Figure 2:
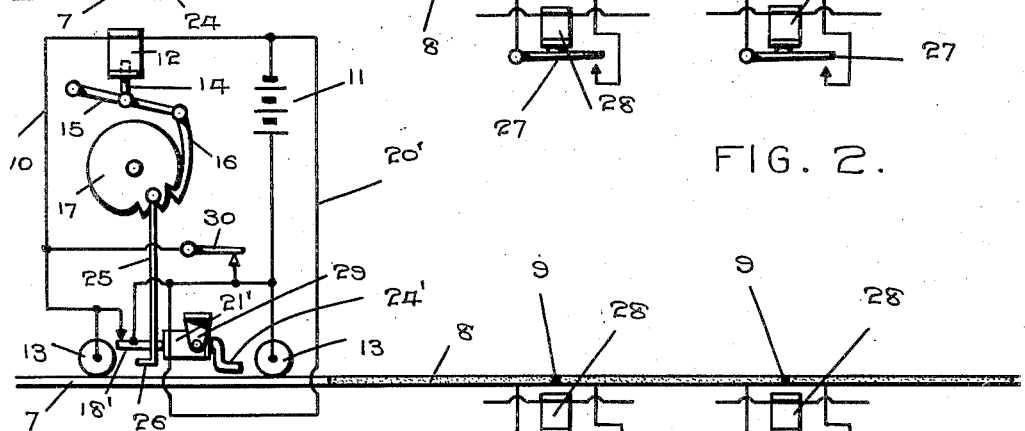
Figure 3:
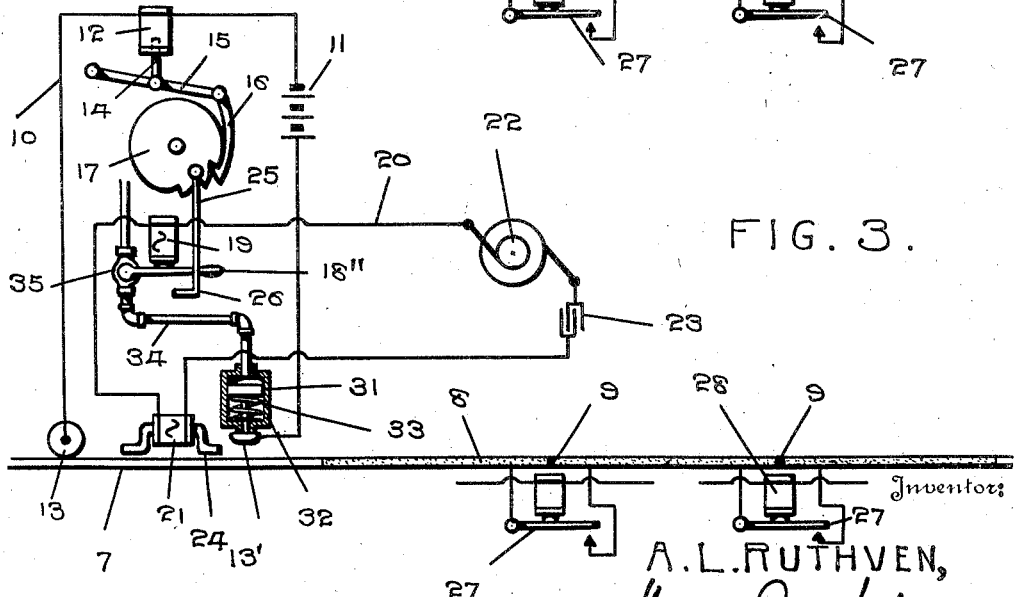

Figures 1, 2 and 3 are diagrammatical views showing three different variations of the improved apparatus.

In carrying out the invention, one rail 7 of the track is provided therein at each controlling station or point of the track with a section 8 of non-magnetic material with which is associated other means for obtaining control of the vehicle equipment. As shown, each non-magnetic rail section 8 has the insulated joints 9 for obtaining a step-by-step control. The non-magnetic section of rail is used for obtaining a positive signal or indication whenever the vehicle passes the controlling station, and to bring the other controlling means or contact device into operation at this point of the track.

Referring in detail to Fig. 1, the vehicle equipment includes a main vehicle controlling circuit 10 having the battery 11 or other source of electrical energy therein and also a solenoid 12 or other responsive electrical means. The terminals of the circuit are connected to the contact wheels or shoes 13 to travel on the rail 7, and which may be wheels of the vehicle or train, one wheel being insulated from the vehicle. The solenoid or responsive means 12 may control the vehicle in any suitable manner. As shown, the core 14 of the solenoid is connected to a lever 15 having a pawl 16 for advancing a ratchet wheel 17 step by step to produce different signals or controlling conditions in succession. Such ratchet device may be used for stepping up from clear position to caution and danger in succession, or may be used for stepping from normal danger position to caution and clear, according to how the apparatus is used. The details of the controlling mechanism from the ratchet wheel 17 on are omitted because they do not form a part of the present invention, this invention residing in the cooperation of the vehicle and track controlling elements.

The circuit 10 between the wheels or shoes 13 is intended to be closed, at the controlling stations, by the rail 7, including the non-magnetic section 8, for the breaking of the circuit 10 one or more times by the insulated joints 9 if such joints are unbridged.

In order to keep the circuit 10 closed when the vehicle is travelling between the controlling stations, so as to avoid accidental breaking of the circuit by sand on the rail, or the like, a switch 18 connects the conductors of the circuit 10 between the wheels 13 and the battery 11 and solenoid 12, so as to shunt the contact wheels and rail. Thus, the switch 18 being normally closed when travelling between the controlling stations, will prevent the circuit 10 from being opened should one or both of the wheels 13 be removed from contact with the rail 7, such as by the presence of sand on the rail, or the like.

The circuit 10 is brought into control from the rail 7 when passing the controlling station, however, by the opening of the switch 18, which will require the closing of the circuit by the rail 7 between the wheels 13. To accomplish this, the switch 18, as shown in Fig. 1, is normally held closed by an alternating current electro-magnet 19 disposed in a circuit 20 with the alternating current generator 22, choke coil or inductive reactance 21 and a condenser or capacity 23. The choke coil 21 is wound on a core 24 having its terminals disposed closely adjacent to the rail 7, whereby the magnetic flux in the core 24 passes through the rail 7 to complete the magnetic circuit of the choke coil. The condenser or capacity 23 is adjusted to balance the inductive reactance of the coil 21, whereby the circuit 20 is normally resonant, resulting in the magnet 19 being energized the maximum amount for holding the switch 18 closed. When the coil 21 is over the magnetic portion of the rail, the magnetic flux can pass between the terminals of the core 24 along the rail, but when the core 21 passes over the non-magnetic section 8 of the rail, this section is the equivalent of a complete air gap between the terminals of the core 24, and this will change the reluctance of the magnetic circuit of the core 24 and cause a change in the self-induction of the coil 21, so that the circuit 20 becomes detuned. This detuning will result in a resistance to the flow of alternating current in the circuit 20 sufficient to deenergize the magnet 19 enough to release the switch 18, and said switch will therefore open when the coil 21 passes over the non-magnetic section of rail. Consequently, when the coil 21 is moving over the magnetic portion of the rail between the controlling stations, the magnet 19 is energized for holding the switch 18 closed and removing the control of the magnet 12 from the rail, whereas when the coil 21 is moving over the non-magnetic section of rail the choking effect will result in the magnet 19 releasing the switch 18, and said switch will remain open while the non-magnetic section of rail is being passed at the controlling station, thereby bringing about the control of the solenoid 12 from the rail.

Bridging switches 27 are provided for the insulated joints 9, and said switches can be controlled by electro-magnets 28 disposed in the track circuits. When the switches 27 are closed, the insulated joints are bridged, thereby preventing the opening of the circuit 10 when passing the insulated joints, whereas when the switches are open, the circuit 10 in passing the insulated joints is broken one or more times according to the number of switches 27 which are open. Each time the circuit 10 passes an insulated joint with the switch open, the circuit is broken, and after passing the joint, the circuit is again closed, thereby resulting in the solenoid 12 advancing the ratchet wheel 17 one step, and the operation is repeated when passing another insulated joint with the bridging switch open. In this way, the ratchet wheel 17 will advance the controlling mechanism step by step.

The contact device is therefore rendered inoperative between the controlling stations and operative at the controlling stations, and the arrangement is such that if the magnet 19 is deenergized by the detuning in circuit 20 when passing a controlling station, under danger condition or with the contact device inoperative for any reason whatever, the switch 18 will remain down and the danger signal or condition thus established will continue to exist (the magnet 19 being unable to raise the switch 18 from dropped position, although said magnet can maintain said switch in raised position). In other words, assuming that the ratchet wheel 17 is in normal danger position and the magnet 19 releases the switch 18 when passing over the non-magnetic section of rail, if the magnets 28 are dead and the switches 27 closed, no response will be received by the vehicle equipment from the track, and a danger indication or condition will thus exist. This will require the magnets 28 to be energized and the switches 27 opened in order to proceed, by the advancing of the ratchet wheel 17 by the making and breaking of the circuit 10. This will provide for the retarding or stopping of the vehicle when the switch 18 remains down, not only when a danger signal or indication is intended, but also when the contact device is out of order or inoperative. With the present arrangement, detectors for the insulated joints 9 are not necessary, because should the insulation break down, the circuit 10 will not be broken and a danger condition will exist.

A danger condition will thus be established and will continue as long as the switch 18 is down. In order to restore the switch 18 so as to be held closed by the magnet 19, when the non-magnetic rail section 8 has been passed and the ratchet wheel 17 advanced, a rod 25 is connected to said ratchet wheel and has a pick-up hook 26 to engage the switch 18 when down, and raise said switch to normal position when said ratchet wheel is advanced by the making and breaking of the circuit 10. Consequently, if the contact device is in working order and the required operations are had for the advance of the vehicle, the rod 25 will return the switch 18 to normal position and the vehicle can proceed. However, if the contact device fails, by the breaking of a circuit, short circuit, break-down of insulation, or the like, then the switch 18 will remain in released position, placing the vehicle equipment in danger condition. The detuning action in the circuit 20, whenever passing a non-magnetic section of rail, will thus establish a danger condition, which can only be eliminated by the proper operative condition of the contact device.

The operation, briefly described, for the normal danger system, is as follows:

When danger conditions exist, both switches 27 are closed, and when the vehicle approaches the control station, the hook 26 is down, with the ratchet wheel 17 in the position shown in Fig. 1, so that the moment the coil 21 passes over the non-magnetic rail section 8, the detuning action in the circuit 20 will release the switch 18, and the circuit 10 must then be completed by way of the rail. The bridges being closed will keep the circuit 10 closed while the vehicle passes the control station, and the switch 18 remaining down will indicate a danger condition, and may, through suitable means, stop the vehicle.

When the switch 18 has been released, so as to drop down, it will remain down even though the magnet 19 is reenergized after the coil 21 has passed the rail section 8.

During clear conditions, both bridging switches 27 are held open, and when the coil 21 moves over the rail section 8, with the wheel 17 in initial position and the hook 26 down, the detuning action in the circuit 20 will release the switch 18 and said switch drops down to indicate a danger condition, the same as occurs whenever passing a control station. When the vehicle passes the first insulated joint 9, with said joint between the contact wheels 13, the circuit 10 is broken, inasmuch as the first bridging switch 27 is open, and the solenoid 12 is deenergized, thereby letting the pawl 16 drop to the second notch of the ratchet wheel 17. Then, when the second wheel 19 passes the first joint 9, the circuit 10 will be completed between the wheels 13 by the rail, between the joints 9, thus energizing the solenoid 12 and raising the pawl 16 to turn the wheel 17 one step. The circuit 10 is then interrupted when passing the second joint 9, so that the solenoid 12 is again deenergized, and the wheel 17 remains in its advanced position while the pawl 16 drops to engage the third notch of the wheel. Then, when the contact wheels 13 have moved beyond the second joint 9, the solenoid 12 is again energized by the reclosing of the circuit 10, thereby turning the wheel 17 a second step, and the switch 18 is thereby raised with the hook 26 into attractive relation with the magnet 19, whereby said switch can be held raised by said magnet to keep the circuit 10 closed when the coil 21 passes from the non-magnetic rail section 8. The switch 18 is thus reclosed by the stepping action, to restore clear conditions. However, the wheel 17 must be returned to initial position and the hook 26 lowered before reaching the next control station, to enable the switch 18 to drop when the coil 21 passes over the non-magnetic rail section. The wheel 17 and hook 26 are restored either manually or by suitable means for that purpose after passing the control station.

When caution conditions exist, one of the switches 27 is open and the other closed, and the switch 18 is dropped, as usual, when the coil 21 passes over the rail section 8. When the vehicle passes the joint 9 with the corresponding bridging switch open, the circuit 10 (which is now closed through the rail because the switch 18 is open) is broken and the solenoid 12 deenergized, so that when the wheels 13 have passed said insulated joint, the solenoid 12 is reenergized to turn the wheel 17 one step. Such wheel is therefore only turned a single step when passing a control station under caution conditions, and the switch 18 is only raised part way, thereby indicating caution conditions, and the wheel 17, hook 26 and switch 18 will remain in this position after the coil 21 has passed the rail section 8. The magnet 19, although reenergized, is not able to lift the switch 18 from its intermediate or caution position. The switch 18 thereby indicates caution conditions, and suitable controlling means may control the vehicle accordingly. After passing the control station, with the vehicle under caution control, the wheel 17 is restored to initial position, to move the hook 26 downwardly, and the switch 18 is then closed, to prepare the device, either manually or by other means, for the next control station. As shown, no automatic control mechanism for the power and brakes of the vehicle is used, so that the control is manual, the switch 18 indicating clear, caution and danger conditions according to its position when passing the control station, and manual resetting is necessary, but automatic means are available for controlling the power and brakes of the vehicle as well known in the prior art.

In the variation shown in Fig. 2, the track equipment and circuit 10 are the same as in Fig. 1, and a responsive magnetic device is also used, although of a different form than the responsive magnetic device as shown in Fig. 1. Thus, an electro-magnet 21' is provided, which is fulcrumed or pivotally mounted, as at 29, above the rail 7 with the core offset downwardly, as at 24', close to the rail, whereby the magnetic attraction will normally swing the magnet 21' against gravity or spring action. The magnet 21' carries a switch 18' for shunting the circuit 10, when the core 24' is attracted to the rail. The electro-magnet 21' is disposed in the circuit 20' with the battery 11 to keep said magnet energized.

In this second form of responsive magnetic means, the magnet 21' is energized by direct current, and the core 24' is attracted to the rail 7 to keep the switch 18' closed when travelling between the controlling stations, which will keep the circuit 10 closed so as not to be broken by sand, dew, rust or other insulating matter on the rail. When the magnet 21' moves over the non-magnetic rail section 8, the magnetic attraction of the core 24' to the rail is lost, and the magnet 21' will therefore swing by gravity or spring action to releasing position, so as to open the switch 18' and therefore require the rail to close the circuit 10 between the wheels or contact members 13. The circuit 10 is therefore broken one or more times if the bridging switches 27 are open. Said magnet 21' and switch 18' will remain in released position, unless restored for again bringing the core 24' into attractive relation with the rail after having passed the non-magnetic section, the magnetic attraction of the core 24' for the rail 7 not being sufficient to move the magnet 21' toward the rail in the released position of said magnet. If the magnet 21' and switch 18' are not restored after passing the non-magnetic section a danger condition is established for stopping the vehicle. However, if the circuit 10 receives the proper interruptions by the insulated joints, the ratchet wheel 17 is advanced and the pick-up hook 26 of the rod 25 will raise the switch 18' and magnet 21' so that the core 24' will again stick in attracted relation with the rail to enable the vehicle to proceed.

In this modification there is also shown an arbitrary arrangement that can be used for requiring the engineer or motorman to be alert when approaching and passing a controlling station. Thus, a switch 30 is provided for normally shunting the circuit 10 the same as the switch 18', and the circuit 10 will remain closed if the engineer or motorman does not open such switch when approaching and passing the controlling station. Consequently, the engineer or motorman must be alert and attentive to his duty, so as to observe the semaphore or wayside signal, to prevent the vehicle being stopped unnecessarily. Should the engineer or motorman fail to open the switch 30 when passing the controlling station, then the circuit 10 will remain closed, and the magnet 21' being released from the rail by the non-magnetic section, will at once establish a danger condition which cannot be avoided because of the failure of the circuit 10 to be broken. This arrangement will compel the alertness of the engineer when approaching signals or semaphores in order from being stopped unless danger conditions exist, and this attention on the part of the engineer will make him more observing, and should he be asleep, incapicitated or neglectful, the vehicle will be stopped. The switch 30 should be such that it will close when released, and can not be kept open by the engineer at all times. The use of the switch 30, however, is optional, and it can also be used in the other forms of apparatus if desired.

However, with the provision of the switch 30, should the engineer or motorman fail to operate the switch 30 as intended, when passing a controlling station, the circuit 10 will remain closed through the switch 30, and said circuit cannot be broken for the operation of the ratchet device, and when the magnet 21' is released from attraction to the rail, this will indicate or produce a danger condition to stop the vehicle. Therefore unless the engineer or motorman operates the switch 30 the vehicle will be brought to a stop, regardless of the track condition, and this will compel the obedience and alertness of the engineer when approaching and passing a controlling station. The switch 30 is not to be confused with a permissive arrangement, because it does not permit of the controlling station to be passed by disregarding the signal indication, but, to the contrary, if the switch 30 is not operated, the vehicle is retarded or stopped, and if the switch is operated it will produce normal controlling conditions.

Fig. 3 shows a further modification wherein the track equipment is the same, and the circuits 10 and 20 are similar to those in Fig. 1 although used in a different manner. There is a contact wheel or shoe 13 at one end of the circuit 10 to bear continually on the rail, and the other terminal of the circuit is connected to a contact shoe 13' movable to and from the rail. The shoe 13' is connected to a piston 31 working in a cylinder 32 and a spring 33 normally retracts the shoe 13' from the rail. An air pipe 34 leading from the air supply reservoir of the vehicle is connected to the cylinder 32 and has a valve 35 which is normally closed, said valve, when opened, permitting the pressure fluid to flow into the cylinder against the piston 31 to force the shoe 13' against the rail. The valve 35 has an arm 18'' which is normally attracted to the alternating current electro-magnet 19 of the circuit 20, whereby the valve is held closed during normal conditions when travelling between the controlling stations. A shoe 13' is thus normally removed from the rail 7 to prevent the intermittent making and breaking of the circuit 10, and when the choke coil 21 passes over the non-magnetic section 8, the choking action in the circuit 20 will deenergize the magnet 19 sufficiently to release the arm 18", and said arm in dropping will open the valve 35 for admitting air to the cylinder 32 so that the shoe 13' is forced against the rail. The circuit 10 can now be broken by the rail, and if the insulated joints 9 are passed with the switches 27 open, the circuit is broken one or more times, for operating the ratchet device. If the ratchet device is advanced, the pick-up hook 26 of the rod 25 will raise the arm 18" to bring the arm into attraction with the magnet 19 when the non-magnetic section has been passed, for restoring normal conditions, but if there has not been a responsive movement of the ratchet device, the rod 25 and arm 18" will remain in lowered position, thereby indicating a danger condition and through suitable controlling means (not shown) may retard or stop the vehicle accordingly. This arrangement permits of a sliding contact shoe 13' being used, the same only contacting with the rail at the controlling stations, to eliminate unnecessary wear, and if the contact device is inoperative or defective, the releasing of the arm 18" from the magnet 19 will create a danger condition notwithstanding the failure of the contact device. A danger condition or signal is thus produced whenever passing a controlling station, and the contact device must be operative to step up to caution or clear condition for the continued movement of the vehicle.

Having thus described the invention, what is claimed as new is:—

1. Vehicle controlling apparatus including controlling means having portions to contact between the vehicle and track, and magnetic means for rendering the firstnamed means inoperative between controlling stations and operative at such stations.

2. Vehicle controlling apparatus including normally inoperative controlling means having portions to contact between the vehicle and track, and magnetic means for rendering said means operative when passing a controlling station.

3. Vehicle controlling apparatus including controlling means having portions to contact between the vehicle and track, magnetic means for rendering the firstnamed means inoperative between controlling stations having a magnetic relation with a rail of the track, and a non-magnetic section in such rail at each controlling station for breaking such magnetic relation and bringing the firstnamed means into operation.

4. Vehicle controlling apparatus including normally inoperative controlling means having portions to contact between the vehicle and track, magnetic means cooperable with a rail of the track and controlling the firstnamed means, and a non-magnetic section in such rail for breaking such magnetic relation to bring the firstnamed means into operation when passing such non-magnetic rail section.

5. Vehicle controlling apparatus including a vehicle carried controlling circuit to be closed by a rail of the track and to be broken by insulated joints in such rail, and magnetic means for rendering said circuit inoperative when passing between controlling stations and operative when passing said stations.

6. Vehicle controlling apparatus including a vehicle carried controlling circuit to be closed by a rail of the track and to be broken by insulated joints in such rail, and magnetic means controlling said circuit for rendering the circuit inoperative when passing between controlling stations and operative when passing said stations, said magnetic means having a magnetic relation with a rail of the track, and a non-magnetic section in said rail at each controlling station for breaking such magnetic relation to bring the firstnamed means into operation.

7. Vehicle controlling apparatus including a vehicle carried controlling circuit to be closed by a rail of the track and to be broken by insulated joints in such rail, means controlling said circuit to render same inoperative when passing between controlling stations and having a member in magnetic relation with the rail, and a non-magetic section in said rail where the insulated joints are located for breaking such magnetic relation to bring the circuit into operative relation with the rail.

8. Vehicle controlling apparatus including a rail of the track having a non-magnetic section, means having a magnetic relation with said rail and such relation being broken when passing the non-magnetic section, and means, having portions to contact between the vehicle and track, brought into operation when such magnetic relation is broken.

9. Vehicle controlling apparatus including a rail of the track having a non-magnetic section, said section having an insulated joint, means having a magnetic relation with said rail and said relation being broken when passing the non-magnetic section, and a vehicle carried controlling circuit controlled by said means for requiring the completion of the circuit by said rail when said magnetic relation is broken.

10. Vehicle controlling apparatus including intermittently operable magnetic means for establishing predetermined conditions in passing controlling stations, and means, having portions to contact between the vehicle and track, operable when passing such stations for cooperation with the firstnamed means to change the controlling conditions.

11. Vehicle controlling apparatus including magnetic means operable when passing controlling stations for producing a predetermined condition, and means, having portions to contact between the vehicle and track, brought into operation and controllable when passing the stations for eliminating such condition.

12. Vehicle controlling apparatus including a non-magnetic section in a rail of the track and an insulated joint in said section, in combination with magnetic means cooperable with the rail, and a vehicle circuit cooperable with the rail to be controlled by said joint, said magnetic means and circuit being cooperable for obtaining different controlling conditions.

13. Vehicle controlling apparatus including a rail of the track having a non-magnetic section, magnetic means having a magnetic relation with said rail and said relation being broken when passing the non-magnetic section for obtaining a predetermined condition, and contact means, having portions to contact between the vehicle and track, operable when passing said non-magnetic section for eliminating such condition.

14. Vehicle controlling apparatus including a rail of the track having a non-magnetic section and an insulated joint, magnetic means having a magnetic relation with the rail and such relation being broken when passing the non-magnetic section, for producing a predetermined controlling condition, and a vehicle circuit cooperable with the rail to be closed thereby when passing the non-magnetic section and including means operable for eliminating said condition.

15. Vehicle controlling apparatus including a rail of the track having a non-magnetic section at each controlling station and insulated joints at said stations, in combination with means for bridging said joints, magnetic means movable along the rail in magnetic relation thereto and such relation being broken when passing the non-magnetic sections for producing a predetermined controlling condition, a vehicle circuit cooperable with the rail when passing the non-magnetic sections, and means operable by the breaking of said circuit by said joints for eliminating such controlling condition.

16. Vehicle controlling apparatus including a rail of the track having a non-magnetic section, means having a magnetic relation with such rail and such relation being broken when passing the non-magnetic section, a member released when such magnetic relation is broken for obtaining a predetermined controlling condition, and contact means between the track and vehicle operable when passing the non-magnetic section for controlling said member.

17. Vehicle controlling apparatus including a rail of the track having a non-magnetic section at each controlling station and insulated joints at the controlling stations, magnetic means having a magnetic relation with the rail and such relation being broken when passing a non-magnetic section, a member arranged to be released when said magnetic relation is broken, for establishing a predetermined controlling condition, a vehicle circuit to be closed by the rail when such magnetic relation is broken, bridging means for said joints for controlling said circuit when passing the joints, and means operated by the breaking of said circuit for controlling said member.

In testimony whereof I hereunto affix my signature.

ALFRED L. RUTHVEN.